(12) United States Patent
Cherkasova (10) Patent No.: US 10,402,762 B2
(45) Date of Patent: Sep. 3, 2019

(54) HETEROGENEOUS PLATFORM CONFIGURATIONS

(71) Applicant: Hewlett Packard Enterprise Development LP, Houston, TX (US)

(72) Inventor: Ludmila Cherkasova, Sunnyvale, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 262 days.

(21) Appl. No.: 15/329,194

(22) PCT Filed: Jan. 23, 2015

(86) PCT No.: PCT/US2015/012713
§ 371 (c)(1),
(2) Date: Jan. 25, 2017

(87) PCT Pub. No.: WO2016/118159
PCT Pub. Date: Jul. 28, 2016

(65) Prior Publication Data
US 2017/0228676 A1    Aug. 10, 2017

(51) Int. Cl.
*G06F 9/48* (2006.01)
*G06F 9/50* (2006.01)
(Continued)

(52) U.S. Cl.
CPC ... *G06Q 10/06313* (2013.01); *G06F 9/44505* (2013.01); *G06F 9/4881* (2013.01);
(Continued)

(58) Field of Classification Search
CPC .......................................... G06Q 10/00–50/00
(Continued)

(56) References Cited

U.S. PATENT DOCUMENTS 8,001,083 B1 * 8/2011 Offer .................... G06F 8/61
707/636
8,171,141 B1 * 5/2012 Offer .................... G06F 9/5077
709/223
(Continued)

FOREIGN PATENT DOCUMENTS

WO    WO-2014052843    4/2014

OTHER PUBLICATIONS

Herodotos Herodotou, et al, No One (Cluster) Size Fits All: Automatic Cluster Sizing for Data-intensive Analytics, Duke University, Oct. 27-28, 2011, 14 Pgs.
(Continued)

*Primary Examiner* — Alan S Miller
(74) *Attorney, Agent, or Firm* — Hewlett Packard Enterprise Patent Department (57) ABSTRACT

A method, system, and computer-readable storage device for selecting a heterogeneous platform configuration is described herein. In one aspect, a heterogeneous evaluation system may receive a platform configuration request from the tenant system. The platform configuration request can specify a job list and a quality of service metric. The heterogeneous evaluation system may then generate a heterogeneous platform configuration selection based on simulations of sub-lists formed from the job list. The heterogeneous platform configuration selection can specify a first platform configuration for a first duster and a second platform configuration for a second duster. The heterogeneous evaluation system can communicate the heterogeneous platform configuration selection to the tenant system.

19 Claims, 8 Drawing Sheets

(51) Int. Cl.
*G06F 9/445* (2018.01)
*G06Q 10/06* (2012.01)
*G06Q 30/06* (2012.01)

(52) U.S. Cl.
CPC .......... *G06F 9/5066* (2013.01); *G06F 9/5072* (2013.01); *G06F 2209/5017* (2013.01); *G06F 2209/5019* (2013.01); *G06Q 30/0645* (2013.01)

(58) Field of Classification Search
USPC ................................................ 705/7.11–742
See application file for complete search history.

(56) References Cited

U.S. PATENT DOCUMENTS

| | | | | |
|---|---|---|---|---|
| 9,071,553 | B2* | 6/2015 | Ravichandran | G06Q 10/06 |
| 9,094,292 | B2* | 7/2015 | Tung | G06F 9/5072 |
| 2007/0288224 | A1* | 12/2007 | Sundarrajan | G06F 9/5072 |
| | | | | 703/22 |
| 2010/0169072 | A1* | 7/2010 | Zaki | G06F 8/30 |
| | | | | 703/28 |
| 2011/0055712 | A1* | 3/2011 | Tung | G06F 9/5072 |
| | | | | 715/738 |
| 2011/0179142 | A1* | 7/2011 | Ravichandran | G06Q 10/06 |
| | | | | 709/218 |
| 2012/0084789 | A1* | 4/2012 | Iorio | G06F 9/5066 |
| | | | | 718/105 |
| 2013/0055243 | A1 | 2/2013 | Dandekar et al. | |
| 2013/0191528 | A1 | 7/2013 | Heninger et al. | |
| 2013/0227558 | A1* | 8/2013 | Du | G06F 9/45558 |
| | | | | 718/1 |
| 2013/0254196 | A1 | 9/2013 | Babu et al. | |
| 2013/0339972 | A1* | 12/2013 | Zhang | G06F 9/5066 |
| | | | | 718/104 |
| 2014/0019987 | A1 | 1/2014 | Verma et al. | |
| 2014/0047272 | A1 | 2/2014 | Breternitz et al. | |
| 2014/0068053 | A1* | 3/2014 | Ravi | G06F 9/5072 |
| | | | | 709/224 |
| 2014/0215487 | A1* | 7/2014 | Cherkasova | G06F 9/5083 |
| | | | | 718/106 |
| 2014/0359126 | A1 | 12/2014 | Breternitz et al. | |

OTHER PUBLICATIONS

International Searching Authority, The International Search Report and the Written Opinion, PCT/US2015/012713, dated Jul. 6, 2015, 10 Pgs.

Zacharia Fadika et al, MARLA: MapReduce for Heterogeneous Clusters, Computer Science Department, Binghamton University, Apr. 16, 2012, 8 Pgs.

Zaharia et al, Improving Mapreduce Performance in Heterogeneous Environments, University of California, Berkeley, Nov. 3, 2008, 14 Pgs.

* cited by examiner

HETEROGENEOUS PLATFORM CONFIGURATIONS

BACKGROUND

A cloud infrastructure can include various resources, including computing resources, storage resources, and/or communication resources, that can be rented by customers (also referred to as tenants) of the provider of the cloud infrastructure. By using the resources of the cloud infrastructure, a tenant does not have to deploy the tenant's own resources for implementing a particular platform for performing target operations. Instead, the tenant can pay the provider of the cloud infrastructure for resources that are used by the tenant. The "pay-as-you-go" arrangement of using resources of the cloud infrastructure provides an attractive and cost-efficient option for tenants that do not desire to make substantial up-front investments in infrastructure.

BRIEF DESCRIPTION OF THE DRAWINGS

The following description illustrates various examples with reference to the following figures.

DETAILED DESCRIPTION

A cloud infrastructure can include various different types of computing resources that can be utilized by or otherwise provisioned to a tenant for deploying a computing platform for processing a workload of a tenant. A tenant can refer to an individual or an enterprise (e.g., a business concern, an educational organization, or a government agency). The computing platform (e.g., the computing resources) of the cloud infrastructure are available and accessible by the tenant over a network, such as the Internet, a local area network (LAN), a wide area network (WAN), a virtual private network (VPN), and so forth.

Computing resources can include computing nodes, where a "computing node" can refer to a computer, a collection of computers, a processor, or a collection of processors. In some cases, computing resources can be provisioned to a tenant according to determinable units offered by the cloud infrastructure system. For example, in some implementations, computing resources can be categorized into computing resources according to processing capacity of different sizes. As an example, computing resources can be provisioned as virtual machines (formed of machine-readable instructions) that emulate a physical machine. A virtual machine can execute an operating system and applications like a physical machine. Multiple virtual machines can be hosted by a physical machine, and these multiple virtual machines can share the physical resources of the physical machine. Virtual machines can be offered according to different sizes, such as small, medium, and large. A small virtual machine has a processing capacity that is less than the processing capacity of a medium virtual machine, which in turn has less processing capacity than a large virtual machine. As examples, a large virtual machine can have twice the processing capacity of a medium virtual machine, and a medium virtual machine can have twice the processing capacity of a small virtual machine. A processing capacity of a virtual machine can refer to a central processing unit (CPU) and memory capacity, for example.

A provider of a cloud infrastructure can charge different prices for use of different resources. For example, the provider can charge a higher price for a large virtual machine, a medium price for a medium virtual machine, and a lower price for a small virtual machine. In a more specific example, the provider can charge a price for the large virtual machine that is twice the price of the medium virtual machine. Similarly, the price of the medium virtual machine can be twice the price of a small virtual machine. Note also that the price charged for a platform configuration can also depend on the amount of time that resources of the platform configuration are used by a tenant.

Also, the price charged by a provider to a tenant can vary based on a duster size by the tenant. If the tenant selects a larger number of virtual machines to include in a cluster, then the cloud infrastructure provider may charge a higher price to the tenant, such as on a per virtual machine basis.

The configuration of computing resources selected by a tenant, such as a processor sizes, virtual machines, computer nodes, network bandwidth, storage capacity, number of virtual machines in a cluster, and the like may be referred to as a platform configuration. The choice of the platform configuration can impact the cost or service level of processing a workload.

A tenant is thus faced with a variety of choices with respect to resources available in the cloud infrastructure, where the different choices are associated with different prices. Intuitively, according to examples discussed above, it may seem that a large virtual machine can execute a workload twice as fast as a medium virtual machine, which in turn can execute a workload twice as fast as a small virtual machine. Similarly, it may seem that a 40-node duster can execute a workload four times as fast as a 10-node cluster.

As an example, the provider of the cloud infrastructure may charge the same price to a tenant for the following two platform configurations: (1) a 40-node cluster that uses 40 small virtual machines; or (2) a 10-node duster using 10 large virtual machines. Although it may seem that either platform configuration (1) or (2) may execute a workload of a tenant with the same performance, in actuality, the performance of the workload may differ on platform configurations (1) and (2). The difference in performance of a workload by the different platform configurations may be due to constraints associated with network bandwidth and persistent storage capacity in each platform configuration. A network bandwidth can refer to the available communication bandwidth for performing communications among computing nodes. A persistent storage capacity can refer to the storage capacity available in a persistent storage subsystem.

Increasing the number of computing nodes and the number of virtual machines may not lead to a corresponding increase in persistent storage capacity and network bandwidth. Accordingly, a workload that involves a larger amount of network communications would have a poorer performance in a platform configuration that distributes the workload across a larger number of computing nodes and virtual machines, for example. Since the price charged to a tenant may depend in part on an amount of time the resources of cloud infrastructure are reserved for use by the tenant, it may be beneficial to select a platform configuration that reduces the amount of time that resources of the cloud infrastructure are reserved for use by the tenant.

Selecting a platform configuration in a cloud infrastructure can become even more challenging when a performance objective is to be achieved. For example, one performance objective may be to reduce (or minimize) the overall completion time (referred to as a "makespan") of the workload. A makespan may be measured from the time a workload begins to when the workload is completed.

Another challenge for selecting a platform configuration for a cluster is that different types of jobs may perform differently depending on platform configuration. That is, some types of workloads may perform better under one platform configuration and other types of workloads may perform better under other platform configurations. Accordingly, for workloads that include jobs of differing types, a single homogeneous set-up (e.g., a cluster where each virtual machine is configured with the same platform configuration) might not always perform better when compared to a heterogeneous set-up (e.g., a set-up that includes multiple clusters, where the virtual machines across different clusters may be configured with different platform configurations). In turn, cost savings may vary across different platform configurations. For example, the execution of one application (e.g., Kmeans) on large VM instances can lead to higher cost savings than the execution of another application (e.g., TeraSort) on small VM instances.

In one aspect, a platform configuration request may be received by a computing system. A platform configuration request may be a message sent by a tenant system that requests configuration of a cloud infrastructure to execute a workload (a set of jobs). In some cases, the platform configuration request can specify a job list and a quality of service metric from a tenant system. The computing system may then split the job list into a first job sub-list and a second job sub-list. The computing system may generate a heterogeneous simulation result that includes a heterogeneous platform configuration and a cost. The heterogeneous simulation result can be based on a heterogeneous simulation. Further, the heterogeneous simulation can include: a first sub-simulation of the first job sub-list on a first platform configuration, and a second sub-simulation of the second job sub-list on a second platform configuration. The computer system may select the heterogeneous platform configuration of the heterogeneous simulation result over other heterogeneous platform configurations based on a comparison of the cost of the heterogeneous simulation result against costs of other heterogeneous simulation results. The heterogeneous platform configuration may then be communicated to the tenant system.

In another aspect, a system may include a processor and a machine-readable storage device. The machine-readable storage device may comprise instructions that, when executed, cause the processor to receive a job list that specifies jobs of a prospective workload. The processor, executing the instructions, may then split the job list into a first job sub-list and a second job sub-list. A first homogeneous simulation result may be generated based on a simulation of the first job sub-list using a first homogeneous platform configuration. Further, a second homogeneous simulation result can be generated based on a simulation of the second job sub-list using a second homogeneous platform configuration. Then, a heterogeneous simulation result can be generated based on the first homogeneous platform configuration and the second homogeneous platform configuration. A cloud infrastructure can provision computer resources according to the heterogeneous simulation result.

In yet another aspect, a heterogeneous evaluation system may receive a platform configuration request from the tenant system. The platform configuration request can specify a job list and a quality of service metric. The heterogeneous evaluation system may then generate a heterogeneous platform configuration selection based on simulations of sub-lists formed from the job list. The heterogeneous platform configuration selection can specify a first platform configuration for a first cluster and a second platform configuration for a second cluster. The first cluster may be assigned to execute one job sub-list and the second cluster may be assigned to execute another job sub-list. The heterogeneous evaluation system can communicate the heterogeneous platform configuration selection to the tenant system.

Figure 1:
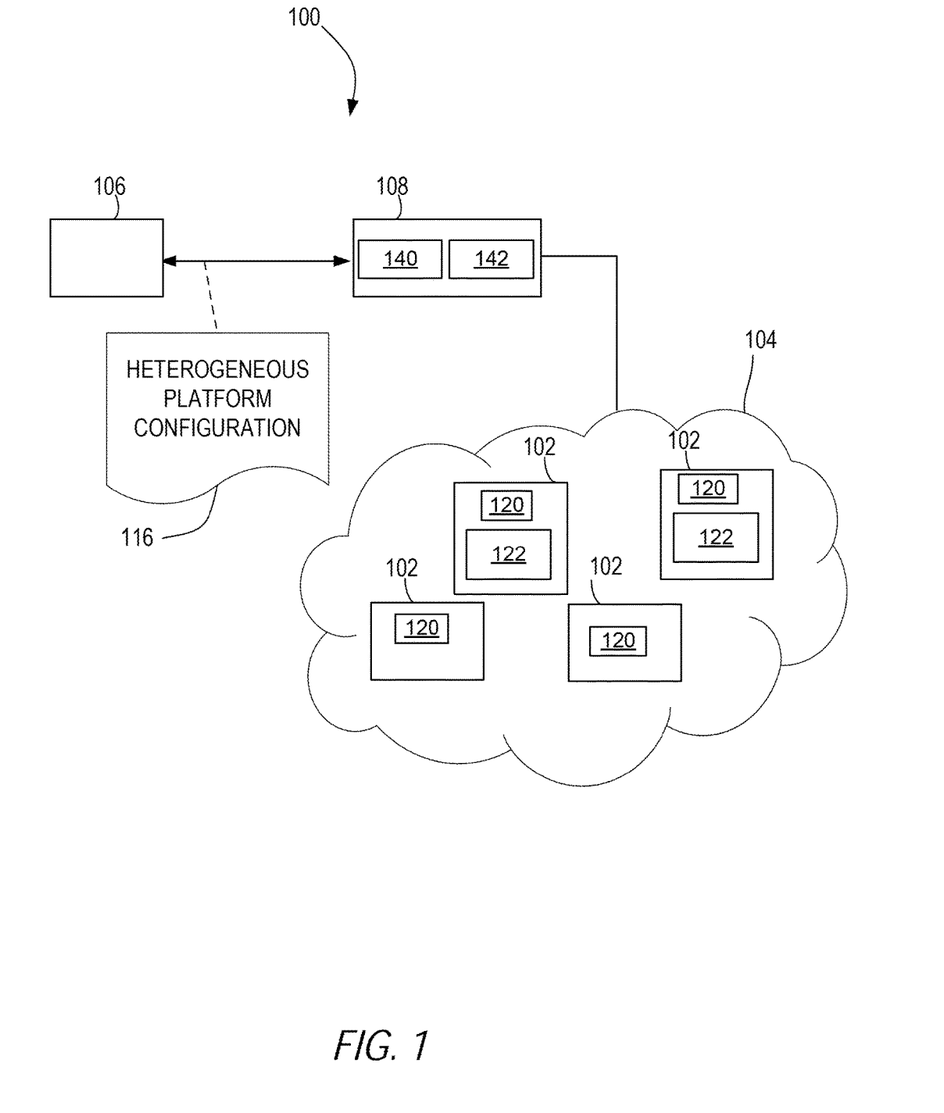
FIG. 1 is a schematic diagram of a cloud infrastructure service that utilizes heterogeneous platform configurations, according to an example.

FIG. 1 is a schematic diagram of a cloud infrastructure service 100 that utilizes heterogeneous platform configurations, according to an example. The cloud infrastructure service 100 includes a tenant system 106, a heterogeneous evaluation system 108, and a cloud infrastructure system 104. The cloud infrastructure system 104 can include computing nodes 102 communicatively coupled by a network. As described above, a computing node may be a computer, a collection of computers, a processor, or a collection of processors. A provider of the cloud infrastructure system 104 may partition computing resources from the computing nodes 102 and rent out those resources to the tenant system 106. For example, as shown in FIG. 1, each of the computing nodes 102 includes a number of virtual machines (VMs), such as virtual machines 120, 122. The virtual machines 120, 122 may be a partitioning of computing resource that is dedicated for a given tenant. The virtual machines may differ according to the underlying computer resources of the computing node that hosts the virtual machine. For example, the virtual machines 120 may be allocated a given amount of processor bandwidth, storage, or any other compute resource, while the virtual machines 122 may be allocated a different amount of processor bandwidth, storage, or any other compute resource.

The tenant system 106 is communicatively coupled to the cloud infrastructure system 104. A tenant system can refer to a computer or collection of computers associated with a tenant. Through the tenant system 106, a tenant can submit a platform configuration request to the cloud infrastructure system 104 to rent the resources of the cloud infrastructure system 104 through, for example, virtual machines executing on the computing nodes 102. A platform configuration request for resources of the cloud infrastructure system 104 can be submitted by a tenant system 106 to a heterogeneous evaluation system 108 of the cloud infrastructure system 104. The platform configuration request can identify a workload of jobs (e.g., a job list) to be performed, and can also specify a target makespan, deadline, and/or a cost the tenant is willing to spend on executing a workload.

The heterogeneous evaluation system 108 may be a computer system that interfaces with the tenant system 106 and the cloud infrastructure system 104. The heterogeneous evaluation system 108 may be a computer system that is configured to select a heterogeneous platform configuration from among multiple heterogeneous platform configurations that can be hosted on the cloud infrastructure system 104. FIG. 1 shows that the heterogeneous evaluation system 108 may include a communication interface 140 to the tenant system 106 and a processor 142. The communication interface 140 may be some combination of hardware, logic, and data that allows the heterogeneous evaluation system 108 to communicate with other computer systems (e.g., the tenant system 106 and/or the cloud infrastructure system 104) over a network. A network interface controller is an example of a communication interface. The processor 142 may be a central processing unit (CPU), a semiconductor-based microprocessor, a graphics processing unit (GPU), other hardware devices or circuitry suitable for retrieval and execution of instructions stored in a computer-readable storage device, or combinations thereof. The processor 142 may include multiple cores on a chip, include multiple cores across multiple chips, multiple cores across multiple devices, or combinations thereof. The processor 142 may fetch, decode, and execute instructions to implement methods and operations discussed above, with reference to FIGS. 1-8

In some cases, a selection of a heterogeneous platform configuration can be presented in a heterogeneous platform configuration selection 116 that the tenant can use to purchase computing resources from the cloud infrastructure system 104. The heterogeneous platform configuration selection 116 may include a user selectable selection of a heterogeneous platform configuration. Example methods and operations for selecting a heterogeneous platform configuration is discussed in greater detail below. Once the heterogeneous platform configuration is selected by the heterogeneous evaluation system 108 (as may be initiated by a tenant through the heterogeneous platform configuration selection 116), the selected resources that are part of the selected heterogeneous platform configuration (including a cluster of computing nodes 102 of a given cluster size, and virtual machines of a given size) are made accessible to the tenant system 106 to perform a workload of the tenant system 106.

Operationally, the heterogeneous evaluation system 108 may receive a platform configuration request from the tenant system 106. The platform configuration request can specify a job list and a quality of service metric. The heterogeneous evaluation system 108 may then generate a heterogeneous platform configuration selection based on simulations of sub-lists formed from the job list. The heterogeneous platform configuration selection can specify a first platform configuration for a first cluster and a second platform configuration for a second duster. The first duster may be assigned to execute one job sub-list and the second duster may be assigned to execute another job sub-list. In FIG. 1, instances of the virtual machines 120 may represent the first cluster, while the virtual machines 122 may represent the second duster.

The heterogeneous evaluation system 108 can communicate the heterogeneous platform configuration selection 116 to the tenant system 106.

By way of example and not limitation, the tenant system 106 may rent computing resources from the cloud infrastructure system 104 to host or otherwise execute a workload that includes MapReduce jobs. Before discussing further aspects of examples of the cloud infrastructure service 100, MapReduce is now discussed. MapReduce jobs operate according to a MapReduce framework that provides for parallel processing of large amounts of data in a distributed arrangement of machines, such as virtual machines 120, as one example. In a MapReduce framework, a MapReduce job is divided into multiple map tasks and multiple reduce tasks, which can be executed in parallel by computing nodes. The map tasks operate according to a user-defined map function, while the reduce tasks operate according to a user-defined reduce function. In operation, map tasks are used to process input data and output intermediate results. Reduce tasks take as input partitions of the intermediate results to produce outputs, based on a specified reduce function that defines the processing to be performed by the reduce tasks. More formally, in some examples, the map tasks process input key-value pairs to generate a set of intermediate key-value pairs. The reduce tasks produce an output from the intermediate key-value pairs. For example, the reduce tasks can merge the intermediate values associated with the same intermediate key.

Although the foregoing may reference provisioning resources from the cloud infrastructure system to execute MapReduce jobs, it is noted that techniques or mechanisms according to other implementations contemplated by this disclosure can be applied to select platform configurations for workloads that include other types of jobs.

Figure 2:
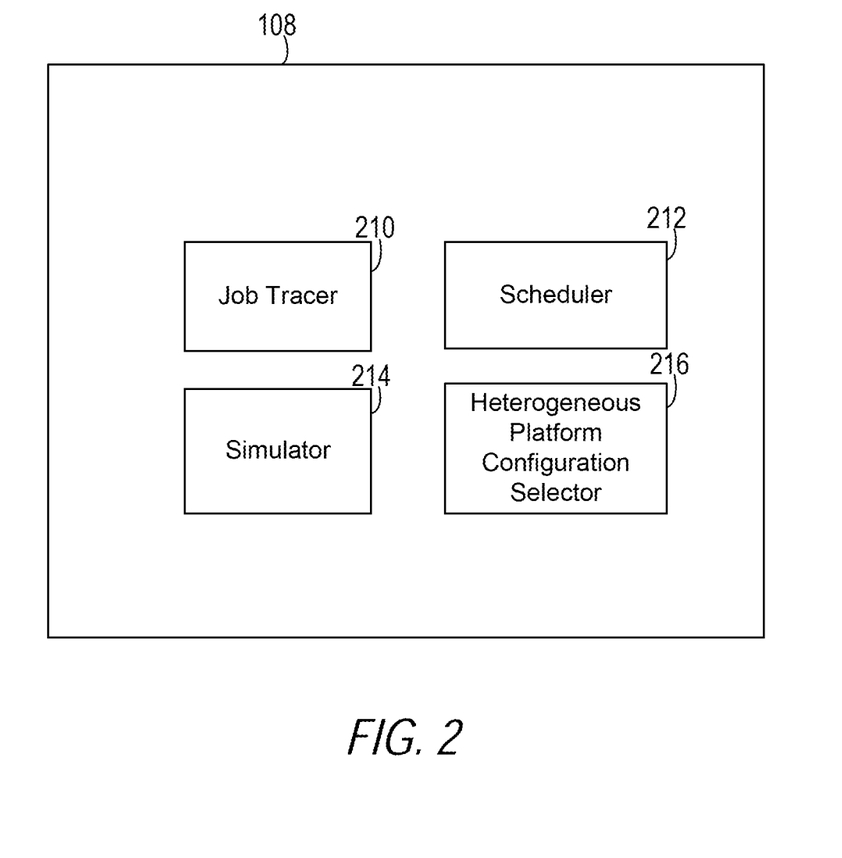
FIG. 2 is a block diagram illustrating example components of the heterogeneous evaluation system, according to some implementations.

FIG. 2 is a block diagram illustrating example components of the heterogeneous evaluation system 108, according to some implementations. The heterogeneous evaluation system 108 shown in FIG. 2 includes a job tracer 210 to produce job trace summaries, a scheduler 212 to generate an execution order for jobs of a workload, a simulator 214 to simulate the execution of jobs of a workload on a candidate platform configuration that includes a given cluster of computing virtual machines executing on compute nodes, and a heterogeneous platform configuration selector 216 to select a platform configuration to achieve a performance target.

Although FIG. 2 depicts the job tracer 210, the scheduler 212, the simulator 214, and the heterogeneous platform configuration selector 216 as being part of the heterogeneous evaluation system 108, it is noted that in other implementations, the job tracer 210, the scheduler 212, the simulator 214, or the heterogeneous platform configuration selector 216 can be modules of systems other than the heterogeneous evaluation system 108, such as the cloud infrastructure system 104.

Figure 3:
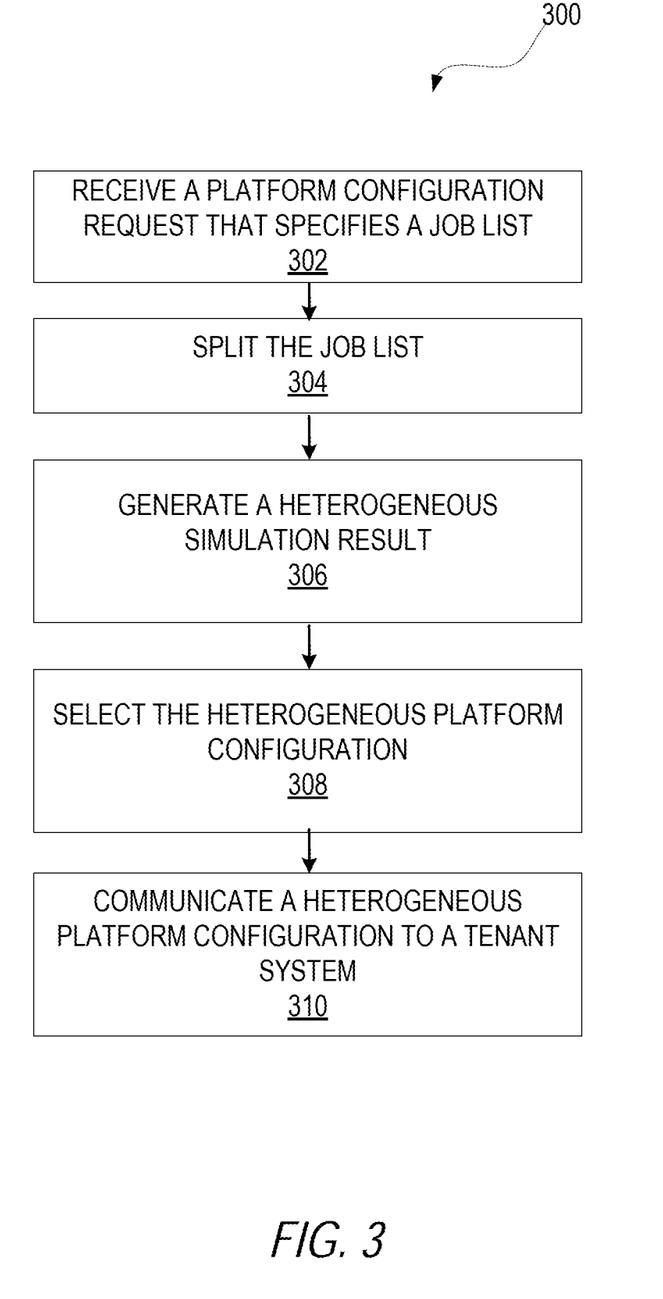
FIG. 3 is a flowchart that illustrates a method for selecting a heterogeneous platform configuration for a list of jobs (e.g., a workload), in accordance to an example.

FIG. 3 is a flowchart that illustrates a method 300 for selecting a heterogeneous platform configuration for a list of jobs (e.g., a workload), in accordance to an example. The method 330 may be performed by the modules, logic, components, or systems shown in FIGS. 1 and 2 and, accordingly, is described herein merely by way of reference thereto. It will be appreciated that the method 300 may, however, be performed on any suitable hardware.

The method 300 may begin at operation 302 when the heterogeneous platform configuration selector 216 receives a platform configuration request. The platform configuration request may, in some cases, specify a job list and a quality of service metric from a tenant system. The quality of service metric may be an expected makespan, cost, or the like. In some cases, a tenant system may transmit the platform configuration request to the heterogeneous platform configuration selector responsive to a user initiated request, which may occur when the user submits the job list to the heterogeneous evaluation system for pricing.

At operation 304, the heterogeneous platform configuration selector may split the job list into a first job sub-list and a second job sub-list. In some cases, the selection of a split point for the job list may be performed systematically. For example, as described below, the job list may be ranked according a preference function that measures a preference a given job has towards a given platform configuration. If the job list is sorted in this way, the split point may be set to the beginning of the job list. Then, further iterations of the operations of the method 300 may update the split point so that each iteration considers different permutations for the first job sub-list and the second job sub-list.

At operation 306, the heterogeneous platform configuration selector may generate a heterogeneous simulation result based on a heterogeneous simulation. The heterogeneous simulation result may specify a heterogeneous platform configuration and a cost. A heterogeneous simulation may include multiple sub-simulations, such as: (a) a first sub-simulation of the first job sub-list on a first platform configuration, and (b) a second sub-simulation of the second job sub-list on a second platform configuration. For example, the first sub-simulation may be performed by a simulator configured to simulate the first job sub-list on a duster of small VM instances, while the second sub-simulation may be performed by a simulator configured to perform a simulation of the second job sub-list on a duster of large VM instances.

At operation 308, the heterogeneous platform configuration selector may select the heterogeneous platform configuration of the heterogeneous simulation result over other heterogeneous platform configurations based on a comparison of the cost of the heterogeneous simulation result against costs of other heterogeneous simulation results. For example, the heterogeneous platform configuration selector may select a heterogeneous platform configuration from a first heterogeneous simulation result over another heterogeneous platform configuration from a second heterogeneous simulation result if the with the first heterogeneous simulation result has a lower cost.

At operation 310, the heterogeneous platform configuration selector may communicate the heterogeneous platform configuration to the tenant system. The heterogeneous platform configuration selector may communicate the selected heterogeneous platform configuration to the tenant system in a heterogeneous platform configuration selection (e.g., such as the heterogeneous platform configuration selection 116 in FIG. 1). In some cases, the heterogeneous platform configuration selection may be configured such that when the tenant system 106 selects or otherwise activates the heterogeneous platform configuration selection, the cloud infrastructure system 104 provisions VMs according to the heterogeneous platform configuration selected by the heterogeneous platform configuration selection. For example, the heterogeneous platform configuration may cause, when activated, the cloud infrastructure system 104 to provision a first duster with one platform configuration (e.g., a given number of small VM instances) and a second duster with another platform configuration (e.g., a given number of large VM instances).

Accordingly, the heterogeneous evaluation system 108 may provide a tenant with a comparatively simple mechanism to select a heterogeneous platform configuration to execute a job list on a cloud infrastructure with multiple dusters.

In some cases, a heterogeneous platform configuration selector may utilize a cost matrix to select a heterogeneous platform configuration. A cost matrix is now discussed in greater detail. In some cases, a cost matrix may include data that characterizes a job's preference for a given platform configuration. This preference may be used to estimate a cost savings splitting the execution of the jobs in a job list over multiple dusters. To estimate a cost savings for different platform configuration choices, assume that a relatively preferred homogeneous platform configuration for processing a given jobs list within deadline D is a duster with $K^H$ VM instances of type $T^H$. Let the processing makespan on this duster be $D^H$ and let $Price^H$ be the price of this type VM instance per time unit. Then the cost of the relatively preferred homogeneous platform configuration may be determined according to:

$$B = D^H \cdot K^H \cdot Price^H$$

Let $Price^{type}$ be the price of a type VM instance per time unit. Then the customer can rent $N^{type}$ of VMs instances of a given type (where type $\in$ {small, medium, large}):

$$N^{type\ max} = B/(D \cdot Price^{type})$$

Using the above calculations, a heterogeneous platform configuration selector can compute a cost metric, referred to as $Cost^{type}(J)$, for each VM instance type and each job J in the set $W=(J_1, J_2, \ldots J_n)$. For example, the heterogeneous platform configuration selector can compute a cost value according to:

$$Cost^{type}(J) = \sum_{1 \leq i \leq N^{type\ max}} Cost^{type\ i}(J)$$

In the above equation, $Cost^{type\ i}(J)$ can denote the cost of executing a given job (e.g., J) on a duster with i VMs instances of type type. As the above equation shows, a cost value (e.g., $Cost^{type}(J)$) may be a value of the summation of $Cost^{type\ i}(J)$ across clusters of instances of type type but varying over different duster sizes. In this way, a cost value may be used to approximate a cost of executing the job using a given instance type over different duster sizes.

For prioritizing (e.g., ranking or sorting) the job's preference to different VM types, the heterogeneous platform configuration selector can generate or otherwise utilize a cost matrix that predicts, for a job, a cost of executing the job on various platform configurations. For example, in some cases, the cost matrix may include a $Cost^{type}(J)$ for each job in a workload and for each platform configuration available in a cloud infrastructure (e.g., in the case of instance size, small, medium, or large). Additionally or alternatively, the cost matrix may include rank values that approximate a preference a respective job has to a given platform configuration. Rank values may be calculated, in some cases, according to:

$$Rank^{s\&m}(J) = Cost^{small}(J) - Cost^{medium}(J);$$

$$Rank^{s\&l}(J) = Cost^{small}(J) - Cost^{large}(J);\ and$$

$$Rank^{m\&l}(J) = Cost^{medium}(J) - Cost^{large}(J).$$

The value of $Rank^{s\&l}(J)$ may indicate a possible preference for a platform configuration choice between small VM instances and large VM instances for the given job J, where the degree of negativity of the value may suggest a preference of small VM instances, the degree of positivity of the value may suggest a preference for large VM instances, and values closer to 0 may reflect less sensitivity to a platform choice. The value of $Rank^{s\&m}(J)$ may indicate a possible preference for a platform configuration choice between small VM instances and medium VM instances for the given job J, where the degree of negativity of the value may suggest a preference of small VM instances, the degree or positivity of the value may suggest a preference for medium VM instances, and values closer to 0 may reflect less sensitivity to a platform choice. The value of $\text{Rank}^{m\&l}(J)$ may indicate a possible preference for a platform configuration choice between medium VM instances and large VM instances for the given job J, where the degree of negativity of the value may suggest a preference of medium VM instances, the degree of positivity of the value may suggest a preference for large VM instances, and values closer to 0 may reflect less sensitivity to a platform choice.

Figure 4:
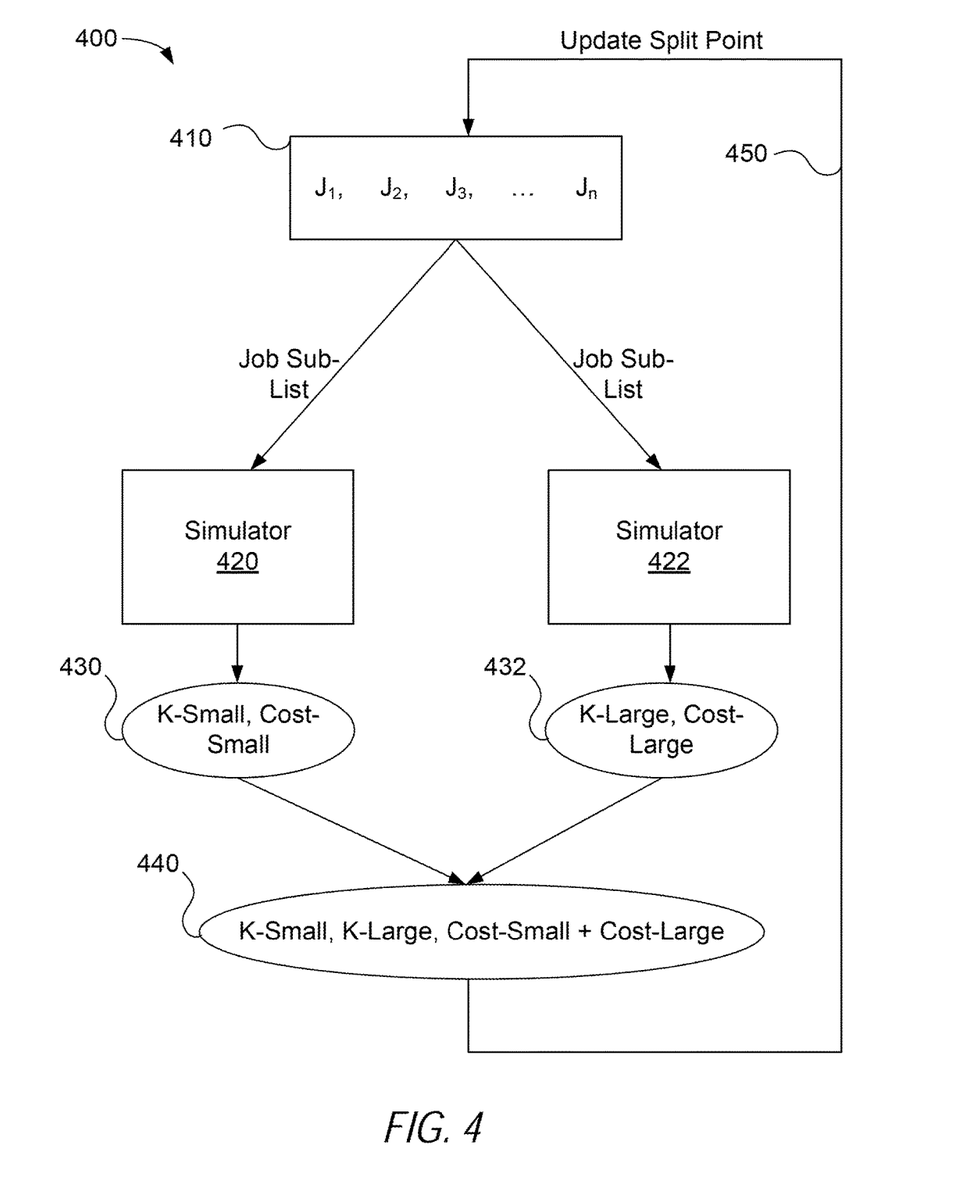
FIG. 4 is a diagram illustrating a method for selecting a heterogeneous platform configuration, according to an example.

FIG. 4 is a diagram illustrating a method 400 for selecting a heterogeneous platform configuration, according to an example. To simplify explanation of FIG. 4, the corresponding disclosure outlines a technique considering small and large VM instances. As is explained later, this approach may be extended to cover other heterogeneous platform configurations, such as heterogeneous platform configurations that include small, medium, or large VM instances.

To begin, the heterogeneous platform configuration selector may sort a job list 410. For example, the heterogeneous platform configuration selector may sort the jobs j∈ $(J_1, \ldots, J_n)$ in ascending order based on comparing the values of $\text{Rank}^{s\&l}(J)$ for each of the jobs in the job list 410. As discussed above, the values of $\text{Rank}^{s\&l}(J)$ may be stored or otherwise derived from the cost matrix. After being sorted, the jobs in the beginning of the sorted job list may have a performance preference for executing on the small VM instances, whereas jobs in the end of the sorted list may have less of a preference (or, in some cases, an aversion) for executing on small VM instances.

Then the heterogeneous platform configuration selector may split the sorted job list into two sub-lists a first sub-list to be executed on a cluster with small instances and the other sub-list to be executed on the duster with large instances. In one example, the heterogeneous platform configuration selector may split the job list at a split point. The split point may be initialized to be before $J_1$, so that that the first job sub-list is empty and the second job sub-list includes $J_1$-$J_n$. Alternatively, the split point may be initialized to be after $J_1$, so that that the first job sub-list includes $J_1$ and the second job sub-list includes $J_2$-$J_n$.

The heterogeneous platform configuration selector may then cause a first simulator 420 to simulate an execution of the jobs in the first job sub-list according to a homogeneous cluster configured with small VM instances. The heterogeneous platform configuration selector may also cause a second simulator 422 to simulate an execution of the jobs in the second job sub-list according to another homogeneous duster that is configured with large VM instances. Both the first and the second simulators may receive the user supplied quality of service metric so that the simulators 420, 422 can select a corresponding platform configuration (e.g., a number of instances) which satisfies the quality of service metric and with minimal cost. Simulating according to a homogeneous platform configuration is discussed in greater detail below.

The simulators 420, 422 may generate homogeneous simulation results 430, 432, respectively. Each homogeneous simulation result may include a homogeneous platform configuration (e.g., a number of instances for an instance type) and a cost to execute the corresponding job sub-list with that platform configuration.

From the homogeneous simulation results 430, 432, the heterogeneous platform configuration selector may generate a heterogeneous simulation result 440 by aggregating the homogeneous simulation results 430, 432. Aggregating the homogeneous simulation results may include creating a heterogeneous simulation result with the platform configuration (e.g., K-Small) of the first homogeneous simulation result 430, the platform configuration (e.g., K-Large) of the second homogeneous simulation result 432, a cost that is the sum of the costs specified in the first homogeneous simulation result (e.g., Cost-Small) and the second homogeneous simulation result (e.g., Cost-Large).

The heterogeneous platform configuration selector may then perform other iterations of the method 400, as shown by loop 450. In executing the loop 450, the heterogeneous platform configuration selector may select another split point and creating new job sub-lists. This can be done by incrementing the split point, which the first job sub-list being the jobs on one side or the split point and the second job sub-list being the jobs on the other side of the split point. An iteration may also include executing the simulators 420, 422 with the new job sub-lists created from the new split point. An iteration can further include creating another heterogeneous simulation result from new homogeneous simulation results. In some cases, the heterogeneous simulation result for each iteration are stored by the heterogeneous platform configuration selector. In other cases, the heterogeneous platform configuration selector may track a preferred heterogeneous platform configuration based on a comparison between a variable that stores a preferred heterogeneous simulation result and the heterogeneous simulation result of the current iteration. If the heterogeneous simulation result of the current iteration is better than the variable that stores the preferred heterogeneous simulation result, the heterogeneous platform configuration selector may then update the variable for the preferred heterogeneous simulation result with the heterogeneous simulation result of the current iteration. If not, the heterogeneous platform configuration selector may then ignore the heterogeneous simulation result of the current iteration.

The heterogeneous platform configuration selector can continue by executing additional iterations until the split point iterates over each job in the job list 410. After the heterogeneous platform configuration selector finishes iterating over the job list, the heterogeneous platform configuration selector may select the homogeneous simulation result that reduces the cost of executing the workload. For example, the heterogeneous platform configuration selector may iterate over the heterogeneous simulation results and select the heterogeneous simulation result with the lowest cost. Alternatively, selecting the homogeneous simulation result can be obtained by accessing the variable storing the preferred homogeneous simulation result.

In such a manner (e.g., iterating over the sorted job list), the heterogeneous platform configuration selector can find the heterogeneous simulation result and the job list split which leads to a solution with a minimal cost. Once the heterogeneous simulation result is selected by the heterogeneous platform configuration selector, the heterogeneous platform configuration selector can place data across the clusters of the homogeneous platform. For example, for the selected heterogeneous simulation result, the heterogeneous platform configuration selector may cause the jobs $J_1, \ldots J_i$ to be executed on a sub-cluster composed on small VM instances and the jobs $J_{i+1}, \ldots J_n$ is to be executed on a sub-duster of large VM instances.

In some cases, the method 400 may be broadened to consider platform configurations beyond large and small instance types. For example, in some cases, the second job sub-list may be re-ranked according to another rank value, such as Rankm&l(J). Then, the second job sub-list may be further split into two job sub-sub lists using a second split point, where a simulator for type medium VM instance executes the first job sub-sub list and a simulator for type large VM instances executes the second sub-sub lists. Each iteration of the method 400 may then increment the second split point, and the first split point increments once the second split point has iterated the second job sub-list.

Figure 5:
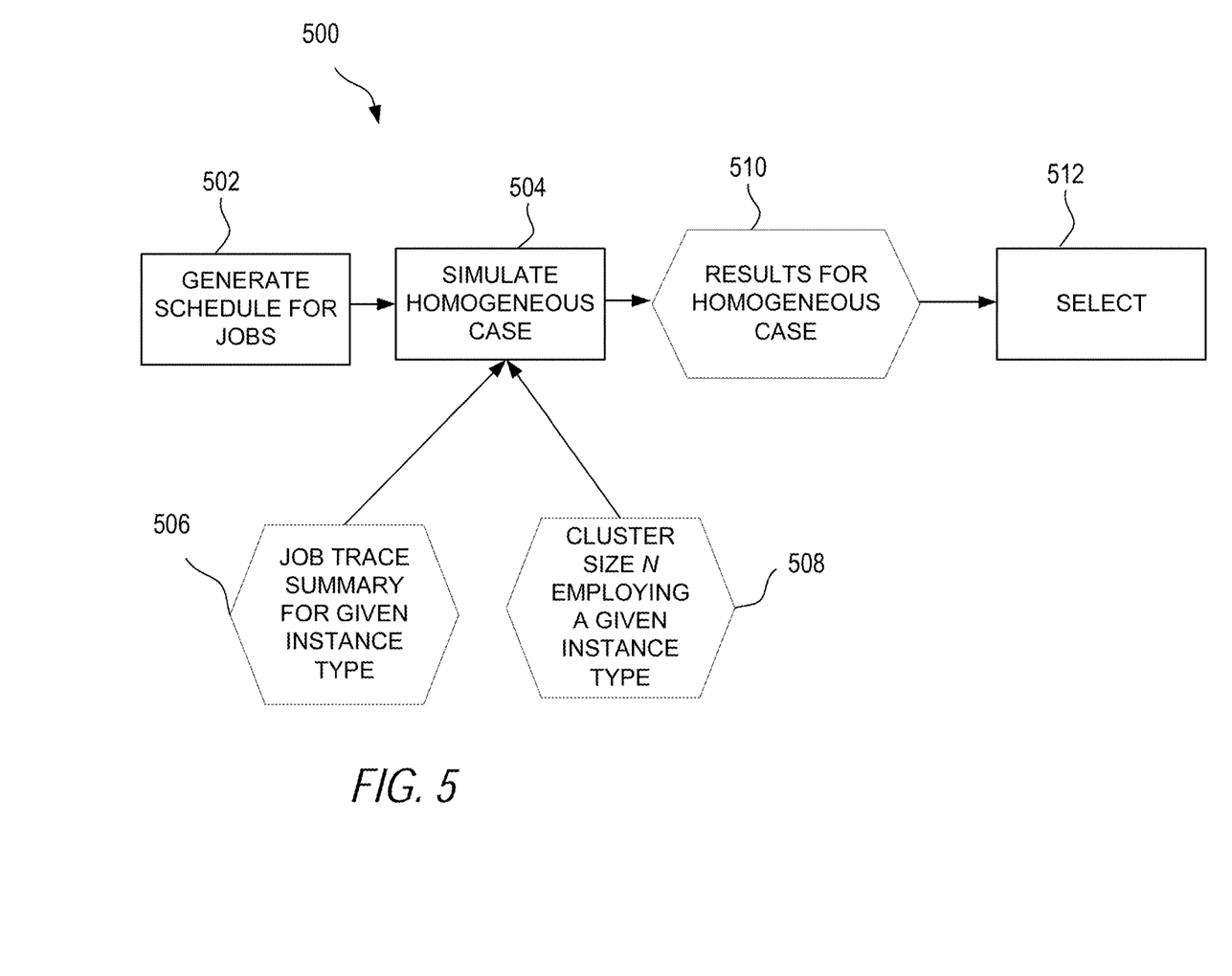
FIG. 5 is a diagram illustrating a method for obtaining a homogeneous simulation result, according to an example.

As discussed above, for example, with reference to simulators 420, 422 of FIG. 4, the heterogeneous platform configuration selector may obtain homogeneous simulation results for each job sub-list. Obtaining homogeneous simulation results is now discussed in greater detail. FIG. 5 is a diagram illustrating a method 500 for obtaining a homogeneous simulation result, according to an example.

At operation 502, a scheduler can produce a schedule (that includes an order of execution of jobs and respective tasks) that reduces (or minimizes) an overall completion time of a job sub-list. In some examples, a Johnson scheduling technique for identifying a schedule of concurrent jobs can be used. In general, the Johnson scheduling technique may provide a decision rule to determine an ordering of tasks that involve multiple processing stages. In other implementations, other techniques for determining a schedule of jobs can be employed. For example, the determination of an improved schedule can be accomplished using a brute-force technique, where multiple orders of jobs are considered and the order with the best or better execution time (smallest or smaller execution time) can be selected as the optimal or improved schedule.

At operation 504, the simulator may simulate the job sub-list. As FIG. 5 shows, operation 504 may take in several inputs, such as the schedule generated at operation 502 and a job trace summary 506 and a duster size 508. The job trace summary 506 may include data or logic that characterizes the execution properties of the jobs that are part of the job sub-list. For MapReduce frameworks, a job trace summary can include data that represents a set of measured durations of map and reduce tasks of a given job on a given platform configuration. The data or logic of the job trace summary can be created for the platform configurations supported by the cloud infrastructure, which can differ, in some cases, by instance type (e.g. different sizes of virtual machines or physical machines) or by cluster sizes, for example. Using the job trace summary, data regarding the tasks of a job can be computed. For example, an average duration and/or maximum duration of map and reduce tasks of each job can be computed. The job trace summaries can be obtained in multiple ways, depending on implementation. For example, the job trace summaries may be obtained, from a job tracer 210: a) from the past run of this job on the corresponding platform (the job execution can be recorded on the arbitrary duster size), b) extracted from the sample execution of this job on the smaller dataset, or, c) interpolated by using a benchmarking approach. The cluster size 508 may be a variable that specifies a number of instances for the cluster.

The result of the simulation executed at operation 504 may form a homogeneous simulation result 510. A homogeneous simulation result may include, among other things: (NumNodes, Cost), where NumNodes specifies the duster size (number of computing nodes in a duster), and Cost represents the cost to the tenant to execute the job sub-list on a cluster of the specified cluster size. The cost can be based on the price charged to a tenant for the respective platform configuration for a given amount of time.

In some cases, operations 502, 504 shown in FIG. 5 may iterate over different cluster sizes to generate additional homogeneous simulation results. For example, some implementations of the operations 502, 504 may execute multiple times where each subsequent execution updates the platform configuration by incrementing the size of the duster (duster size 508). For each iteration of operations 502, 504, the scheduler produces a new job schedule for the increased duster size. Further, for each iteration, the simulator simulates the job trace summary using the new schedule and the updated duster size. These simulations generate additional homogeneous simulation results. In this way, repeated execution of operations 502, 504 may add additional homogeneous simulation results with varying duster sizes. The operations 502, 504 can repeat in this way until the simulator simulates execution of a cluster with predetermined duster size. Alternatively, the operations 502, 504 can repeat until an increase in cluster size does not improve the achievable makespan by greater than some specified threshold. The latter condition can happen when the cluster is large enough to accommodate concurrent execution of the jobs of the workload, and consequently, increasing the cluster size cannot improve the makespan by a substantial amount.

After the search space has been built, the simulator may, at operation 512, select a homogeneous simulation result from the generated homogeneous simulation results. In some examples, the simulator can select a homogeneous simulation result based on selecting the homogeneous simulation result with the lowest cost in the set of homogeneous simulation results.

The foregoing further describes determining a schedule of jobs of a workload, according to some implementations, which was introduced above with reference to operation 502 of FIG. 5. For a set of MapReduce jobs (with no data dependencies between them), the order in which the jobs are executed may impact the overall processing time, and thus, utilization and the cost of the rented platform configuration (note that the price charged to a tenant can also depend on a length of time that rented resources are used—thus increasing the processing time can lead to increased cost).

Figure 6:
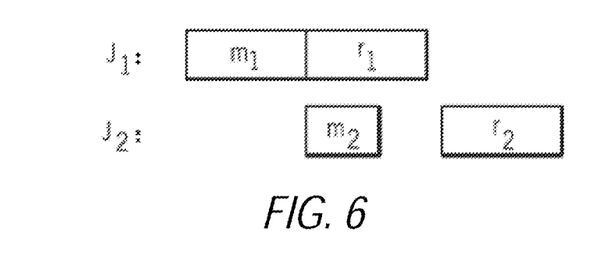
FIGS. 6 and 7A-7B illustrate execution orders of jobs, according to some examples.

The following considers an example execution of two (independent) MapReduce jobs $J_1$ and $J_2$ in a cluster, in which no data dependencies exist between the jobs. As shown in FIG. 6, once the map stage ($m_1$) of $J_1$ completes, the reduce stage ($r_1$) of job $J_1$ can begin processing. Also, the execution of the map stage ($m_2$) of the next job $J_2$ can begin execution, by using the map resources released due to completion of the map stage ($m_1$) of $J_1$. Once the map stage ($m_2$) of the next job $J_2$ completes, the reduce stage ($j_2$) of the next job $j_2$ can begin. As shown in FIG. 6, there is an overlap in executions of map stage ($m_2$) of job $J_2$ and the reduce stage ($r_1$) of job $J_1$.

A first execution order of the jobs may lead to a less efficient resource usage and an increased processing time as compared to a second execution of the jobs. To illustrate this, consider an example workload that includes the following two jobs:

Job $J_1=(m_1, r_1)=(20\ s, 2\ s)$ (map stage has a duration of 20 seconds, and reduce stage has a duration of two seconds).

Job $J_2=(m_2, r_2)=(2\ s, 20\ s)$ (map stage has a duration of two seconds, and reduce stage has a duration of 20 seconds).

Figure 7A:
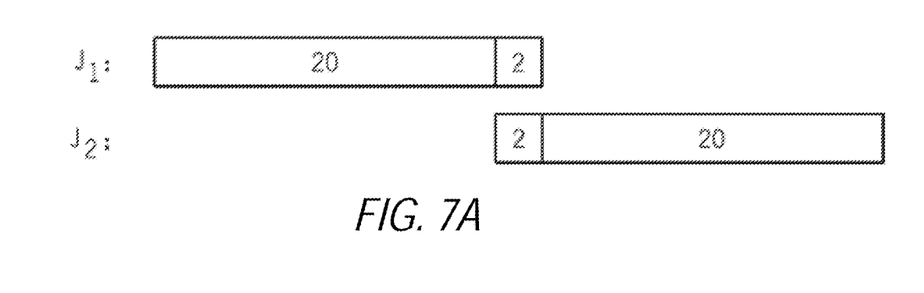
Figure 7B:
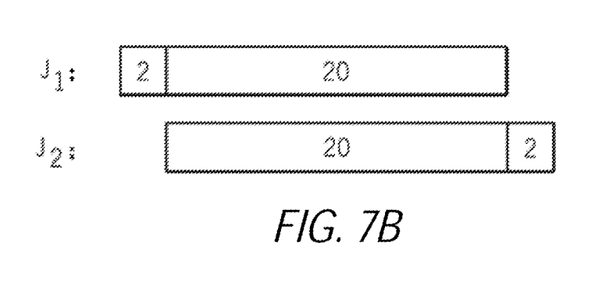

There are two possible execution orders for jobs $J_1$ and $J_2$ shown in FIGS. 7A and 7B:

$J_1$ is followed by $J_2$ (FIG. 7A). In this execution order, the overlap of the reduce stage of $J_1$ with the map stage of $J_2$ extends two seconds. As a result, the total completion time of processing jobs $J_1$ and $J_2$ is 20 s+2 s+20 s=42 s.

$J_2$ is followed by $J_1$ (FIG. 7B). In this execution order, the overlap of the reduce stage of $J_2$ with the map stage of $J_1$ extends 20 seconds. As a result, the total completion time is 2 s+20 s+2 s=24 s, which is less than the first execution order.

More generally, there can be a substantial difference in the job completion time depending on the execution order of the jobs of a workload. A workload $\mathcal{J} = \{J_1, J_2, \ldots, J_n\}$, includes a set of n MapReduce jobs with no data dependencies between them. The scheduler generates an order (a schedule) of execution of jobs $J_i \in \mathcal{J}$ such that the makespan of the workload is minimized. For minimizing the makespan of the workload of jobs $\mathcal{J} = \{J_1, J_2, \ldots, J_n\}$, the Johnson scheduling technique can be used.

Each job J in the workload $\mathcal{J}$ of n jobs can be represented by the pair $(m_i, r_i)$ of map and reduce stage durations, respectively. The values of $m_i$ and $r_i$ can be estimated using lower and upper bounds, as discussed above, in some examples. Each job $J_i = (m_i, r_i)$ can be augmented with an attribute $D_i$ that is defined as follows:

$$D_i = \begin{cases} (m_i, m) & \text{if } \min(m_i, r_i) = m_i, \\ (r_i, r) & \text{otherwise.} \end{cases}$$

The first argument in $D_i$ is referred to as the stage duration and denoted as $D_i^1$. The second argument in $D_i$ is referred to as the stage type (map or reduce) and denoted as $D_i^2$. In the above, $(m_i, m)$, $m_i$ represents the duration of the map stage, and m denotes that the type of the stage is a map stage. Similarly, in $(r_i, r)$, $r_i$ represents the duration of the reduce stage, and r denotes that the type of the stage is a reduce stage.

An example pseudocode of the Johnson scheduling technique is provided below.

---
Johnson scheduling technique
---

Input: A set $\mathcal{J}$ of n MapReduce jobs. $D_i$ is the attribute of job $J_i$ as defined above.
Output: Schedule σ (order of execution of jobs).
1: Sort the set $\mathcal{J}$ of jobs into an ordered list L using their stage duration attribute $D_i^1$
2: head ← 1, tail ← n
3: for each job $J_i$ in L do
4:    if $D_i^2$ = m then
5:       // Put job $J_i$ from the front
6:       $\sigma_{head} \leftarrow J_i$, head ← head + 1
7:    Else
8:       // Put job $J_i$ from the end
9:       $\sigma_{tail} \leftarrow J_i$, tail ← tail − 1
10:   end if
11: end for

---

Figure 8:
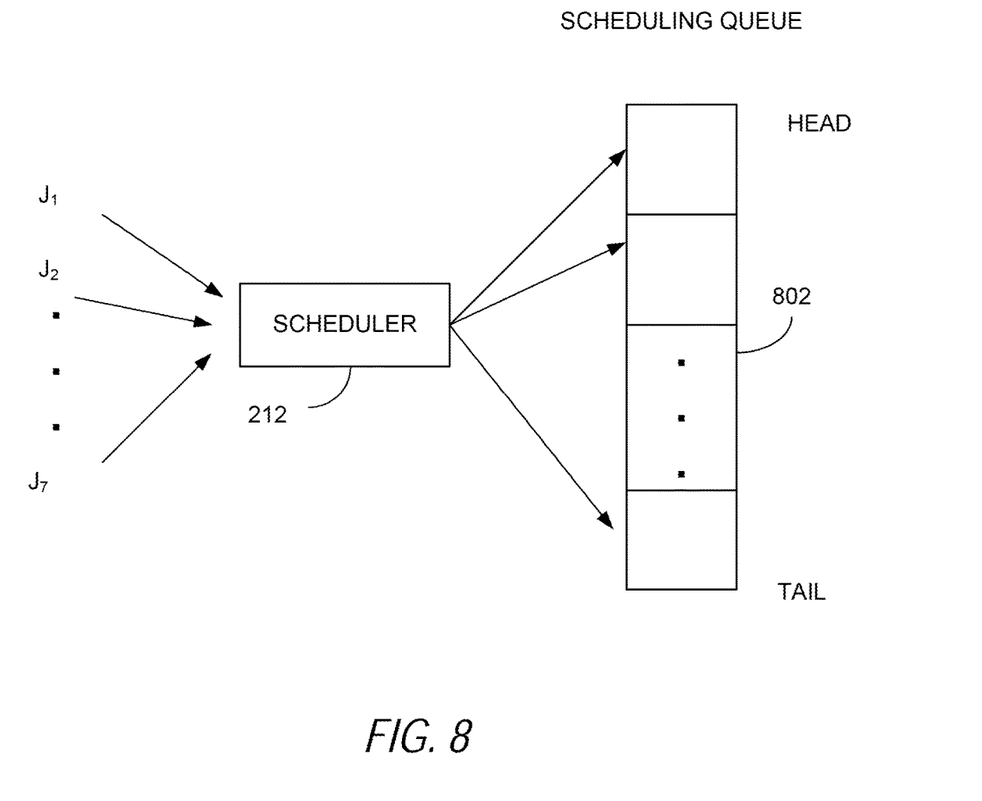
FIG. 8 is a diagram which shows an scheduling queue that includes a number of entries in which jobs of the set j of jobs are to be placed, according to an example.

The Johnson scheduling technique (as performed by the scheduler) depicted above is discussed in connection with FIG. 8, which shows an scheduling queue 802 that includes a number of entries in which jobs of the set $\mathcal{J}$ of jobs are to be placed. Once the scheduling queue 802 is filled, then the jobs in the scheduling queue 802 can be executed in an order from the head (head) of the queue 802 to the tail (tail) of the scheduling queue 802. At line 2 of the pseudocode, head is initialized to the value 1, and tail is initialized to the value n (n is the number of jobs in the set $\mathcal{J}$).

Line 1 of the pseudocode sorts the n jobs of the set $\mathcal{J}$ in the ordered list L in such a way that job $J_i$ precedes job $J_{i+1}$ in the ordered list L if and only if $\min(m_i, r_i) \leq \min(m_{i+1}, r_{i+1})$. In other words, the jobs are sorted using the stage duration attribute $D_i^1$ in $D_i$ (stage duration attribute $D_i^1$ represents the smallest duration of the two stages).

The pseudocode takes jobs from the ordered list L and places them into the schedule σ (represented by the scheduling queue 802) from the two ends (head and tail), and then proceeds to place further jobs from the ordered list L in the intermediate positions of the scheduling queue 802. As specified at lines 4-6 of the pseudocode, if the stage type $D_i^2$ in $D_i$ is m, i.e., $D_i^2$ represents the map stage type, then job $J_i$ is placed at the current available head of the scheduling queue 802 (as represented by head, which is initiated to the value 1. Once job $J_i$ is placed in the scheduling queue 802, the value of head is incremented by 1 (so that a next job would be placed at the next head position of the scheduling queue 802).

As specified at lines 7-9 of the pseudocode, if the stage type $D_i^2$ in $D_i$ is not m, then job $J_i$ is placed at the current available tail of the scheduling queue 802 (as represented by tail, which is initiated to the value n. Once job $J_i$ is placed in the scheduling queue 802, the value of tail is incremented by 1 (so that a next job would be placed at the next tail position of the scheduling queue 802).

Figure 9:
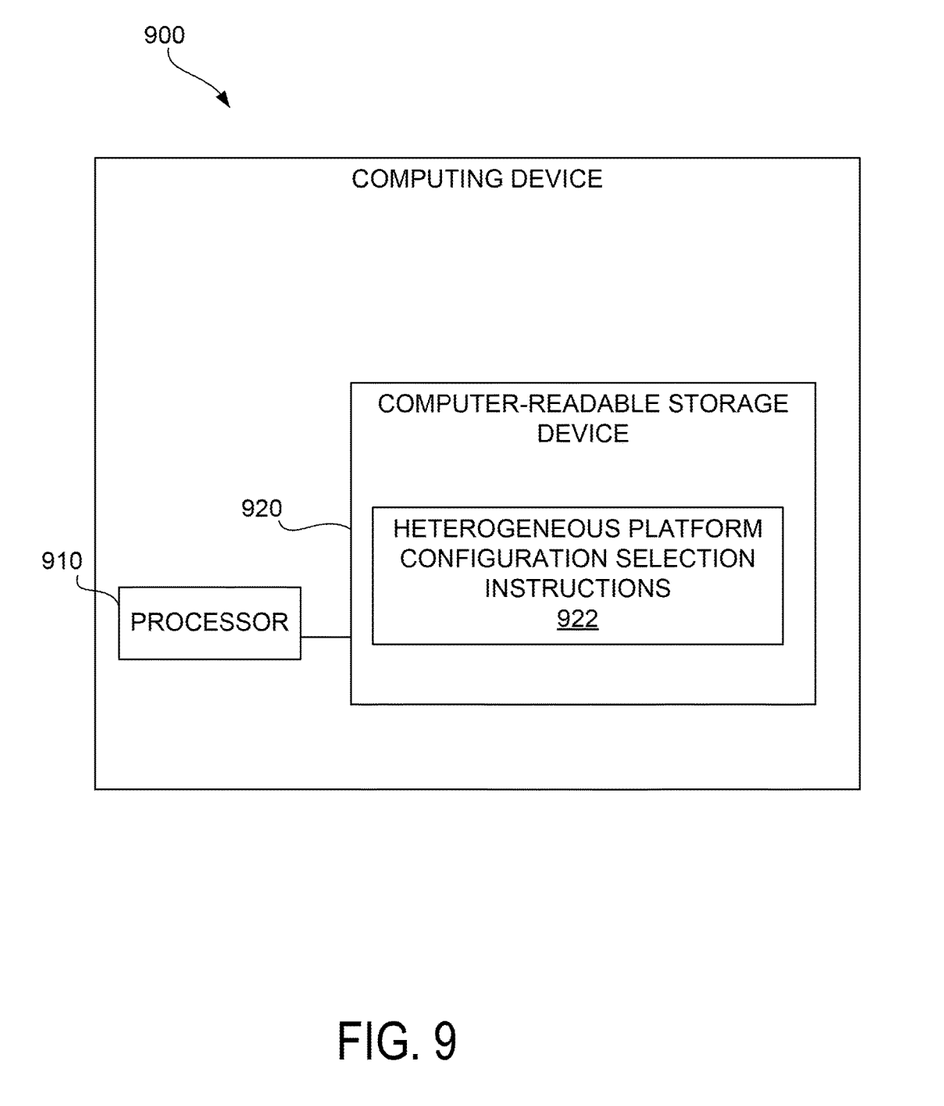
FIG. 9 is a block diagram of a computing device capable of selecting a platform configuration in light of a failure case, according to one example.

FIG. 9 is a block diagram of a computing device 900 capable of selecting a platform configuration, according to one example. The computing device 900 includes, for example, a processor 910, and a computer-readable storage device 920 including homogeneous platform configuration selection instructions 922. The computing device 900 may be, for example, a memory node, a processor node, (see FIG. 1) or any other suitable computing device capable of providing the functionality described herein.

The processor 910 may be a central processing unit (CPU), a semiconductor-based microprocessor, a graphics processing unit (GPU), other hardware devices or circuitry suitable for retrieval and execution of Instructions stored in computer-readable storage device 920, or combinations thereof. For example, the processor 910 may include multiple cores on a chip, include multiple cores across multiple chips, multiple cores across multiple devices, or combinations thereof. The processor 910 may fetch, decode, and execute instructions to implement methods and operations discussed above, with reference to FIGS. 1-8.

As an alternative or in addition to retrieving and executing instructions, processor 910 may include at least one integrated circuit ("IC"), other control logic, other electronic circuits, or combinations thereof that include a number of electronic components for performing the functionality of instructions 922.

Computer-readable storage device 920 may be any electronic, magnetic, optical, or other physical storage device that contains or stores executable instructions. Thus, computer-readable storage device may be, for example, Random Access Memory (RAM), an Electrically Erasable Programmable Read-Only Memory (EEPROM), a storage drive, a Compact Disc Read Only Memory (CD-ROM), non-volatile memory, and the like. As such, the machine-readable storage device can be non-transitory. As described in detail herein, computer-readable storage device 920 may store heterogeneous platform configuration selection instructions 922 for selecting a heterogeneous platform configuration. The instructions 922 may cause the processor 910 to receive a job list specifying jobs of a prospective workload. The instructions may also cause the processor to split the job list into a first job sub-list and a second job sub-list. A first homogeneous simulation result may then be generated based on a simulation of the first job sub-list using a first homogeneous platform configuration. A second homogeneous simulation result may also be generated based on a simulation of the second job sub-list using a second homogeneous platform configuration. The instructions may then cause the processor to generate a heterogeneous simulation result based on the first homogeneous platform configuration and the second homogeneous platform configuration. The processor may then, based on executing the instructions 922, provision resources on a cloud infrastructure according to the heterogeneous simulation result. As discussed above, additional or alternative instructions may be stored by the computer-readable storage device 920 that may cause the processor to execute any of the operations discussed above.

As used herein, the term "computer system" may refer to one or more computer devices, such as the computer device 900 shown in FIG. 9. Further, the terms "couple," "couples," "communicatively couple," or "communicatively coupled" is intended to mean either an indirect or direct connection. Thus, if a first device, module, or engine couples to a second device, module, or engine, that connection may be through a direct connection, or through an indirect connection via other devices, modules, logic, engines and connections. In the case of electrical connections, such coupling may be direct, indirect, through an optical connection, or through a wireless electrical connection.

While this disclosure makes reference to some examples, various modifications to the described examples may be made without departing from the scope of the claimed features.

What is claimed is:

1. A method comprising:
receiving, by a computing system from a tenant system, a platform configuration request specifying a job list;
splitting, by the computing system, the job list into a first job sub-list and a second job sub-list, wherein splitting the job list into the first job sub-list and the second job sub-list comprises calculating rank values for jobs in the job list, each rank value approximating a preference a respective job has to a given platform configuration, and sorting the job list according to the rank values;
generating, by the computing system, a heterogeneous simulation result that specifies a heterogeneous platform configuration and a cost, the heterogeneous simulation result being based on a heterogeneous simulation, the heterogeneous simulation including: a first sub-simulation of the first job sub-list on a first platform configuration, and a second sub-simulation of the second job sub-list on a second platform configuration;
selecting, by the computing system, the heterogeneous platform configuration of the heterogeneous simulation result over other heterogeneous platform configurations based on a comparison of the cost of the heterogeneous simulation result against costs of other heterogeneous simulation results;
communicating, by the computing system, the heterogeneous platform configuration to the tenant system; and
cause provisioning of resources of an infrastructure according to the heterogeneous platform configuration.

2. The method of claim 1, further comprising identifying a split point in the sorted job list to split the job list into the first job sub-list and the second job sub-list.

3. The method of claim 1, wherein calculating a first rank value of the rank values comprises:

generating a first cost value for a job, the first cost value approximating a cost of executing the job using a first instance type over different cluster sizes;
generating a second cost value for the job, the second cost value approximating a cost of executing the job using a second instance type over the different cluster sizes, wherein the first rank value is a function of the first cost value and the second cost value.

4. The method of claim 1, wherein the heterogeneous platform configuration specifies an instance count for a first instance type and an instance count for a second instance type.

5. The method of claim 4, wherein causing the provisioning of the resources of the infrastructure is responsive to detecting a tenant activation of the heterogeneous platform configuration.

6. The method of claim 1, wherein the cost is an aggregation of a first cost associated with a first homogeneous simulation result of the first sub-simulation, and a second cost associated with a second homogeneous simulation result of the second sub-simulation.

7. The method of claim 4, wherein causing the provisioning of the resources of the infrastructure comprises causing provisioning of a first cluster in a cloud infrastructure according to the instance count for the first instance type, and provisioning of a second cluster according to the instance count for the second instance type.

8. The method of claim 1, wherein the first sub-simulation of the first job sub-list produces a first homogeneous simulation result including a first homogeneous platform configuration, and the second sub-simulation of the second job sub-list produces a second homogeneous simulation result including a second homogeneous platform configuration different from the first homogeneous platform configuration, and wherein the heterogeneous simulation result is an aggregate of the first homogeneous simulation result and the second homogeneous simulation result, and the heterogeneous platform configuration includes the first homogeneous platform configuration and the second homogeneous platform configuration.

9. A non-transitory machine-readable storage medium comprising instructions that, when executed, cause a system to:
receive a job list specifying jobs of a workload;
split the job list into a first job sub-list and a second job sub-list;
generate a first homogeneous simulation result based on a simulation of the first job sub-list using a first homogeneous platform configuration;
generate a second homogeneous simulation result based on a simulation of the second job sub-list using a second homogeneous platform configuration that is different from the first homogeneous platform configuration;
generate a heterogeneous simulation result based on aggregating the first homogeneous simulation result and the second homogeneous simulation result, the heterogeneous simulation result specifying a heterogeneous platform configuration comprising the first homogeneous platform configuration and the second homogeneous platform configuration; and
provision resources on a cloud infrastructure according to the heterogeneous platform configuration.

10. The non-transitory machine-readable storage medium of claim 9, wherein:

the first homogeneous platform configuration includes a first instance count for a first type of instance and a first cost;

the second homogeneous platform configuration includes a second instance count for a second type of instance and a second cost; and the heterogeneous simulation result includes the first instance count for the first type of instance, the second instance count for the second type of instance, and an aggregation of the first cost and the second cost.

11. The non-transitory machine-readable storage medium of claim 10, wherein the simulation of the first job sub-list uses a schedule generated from the first job sub-list.

12. The non-transitory machine-readable storage medium of claim 11, wherein the second type characterizes another amount of computing resources allocated to another virtual machine.

13. The non-transitory machine-readable storage medium of claim 9, wherein the splitting of the job list into the first job sub-list and the second job sub-list is part of a first iteration that uses a first split point in the job list to perform the splitting, wherein the generating of the first homogeneous simulation result, the generating of the second homogeneous simulation result, and the generating of the heterogeneous simulation result are performed as part of the first iteration, and wherein the instructions when executed cause the system to further:

perform a second iteration that uses a second split point for the job list, the second iteration comprising:
    splitting the job list into a third job sub-list and a fourth job sub-list according to the second split point,
    generating a third homogeneous simulation result based on a simulation of the third job sub-list using the first homogeneous platform configuration,
    generating a fourth homogeneous simulation result based on a simulation of the fourth job sub-list using the second homogeneous platform configuration,
    generate a further heterogeneous simulation result based on aggregating the third homogeneous simulation result and the fourth homogeneous simulation result; and
compare a cost of the further heterogeneous simulation result with a cost of the heterogeneous simulation result to select the heterogeneous simulation result.

14. The non-transitory machine-readable storage medium of claim 9, wherein splitting the job list into the first job sub-list and the second job sub-list comprises calculating rank values for jobs in the job list, each rank value approximating a preference a respective job has to a given platform configuration, and sorting the job list according to the rank values.

15. A computer system comprising:
a communication interface to a tenant system;
a processor; and
a non-transitory storage medium storing instructions executable on the processor to:
    receive a platform configuration request from the tenant system, the platform configuration request specifying a job list;
    generate a heterogeneous platform configuration selection based on simulations of sub-lists of the job list, the heterogeneous platform configuration selection specifying a first platform configuration for a first cluster and a second platform configuration for a second cluster, the generating of the heterogeneous platform configuration selection comprising:
        in each respective iteration of a plurality of iterations:
            splitting the job list into a first job sub-list and a second job sub-list using a respective split point in the job list, the respective split point used in the respective iteration being different from another split point used in another iteration of the plurality of iterations,
            generating a respective heterogeneous simulation result that specifies a respective heterogeneous platform configuration and a respective cost, the respective heterogeneous simulation result based on simulating the first job sub-list on a first platform configuration, and simulating the second job sub-list on a second platform configuration;
        comparing the respective costs to select one of the respective heterogeneous simulation results as the heterogeneous platform configuration selection; and
    communicate the heterogeneous platform configuration selection to the tenant system to cause provisioning of resources of an infrastructure for a workload including the job list.

16. The computer system of claim 15, further comprising a communication interface to a cloud infrastructure system, wherein the instructions are executable on the processor to further:
responsive to receiving a response from the tenant system, provision, within the cloud infrastructure system, the first cluster using the first platform configuration of the heterogeneous platform configuration selection, and the second cluster using the second platform configuration of the heterogeneous platform configuration selection.

17. The computer system of claim 15, wherein the first platform configuration specifies a first virtual machine size and the second platform configuration specifies a second virtual machine size.

18. The computer system of claim 17, wherein the first platform configuration further specifies a first instance count, and the second platform configuration further specifies a second instance count.

19. The computer system of claim 15, wherein splitting the job list into the first job sub-list and the second job sub-list comprises calculating rank values for jobs in the job list, each rank value approximating a preference a respective job has to a given platform configuration, and sorting the job list according to the rank values.

\* \* \* \* \*